United States Patent [19]

Dorbandt

[11] Patent Number: 4,962,900
[45] Date of Patent: Oct. 16, 1990

[54] FISHING LINE REEL SELECTIVELY OPERATED IN THE RIGHT-HAND OR LEFT-HAND MODE

[75] Inventor: Klaus Dorbandt, Berlin, Fed. Rep. of Germany

[73] Assignee: D.A.M. Deutsche Angelgerate Manufaktur Hellmuth Kuntze GmbH & Co., Fed. Rep. of Germany

[21] Appl. No.: 245,215

[22] Filed: Sep. 16, 1988

[30] Foreign Application Priority Data

Sep. 16, 1987 [DE] Fed. Rep. of Germany ....... 3731553

[51] Int. Cl.$^5$ .................... A01K 89/027; A01K 89/01
[52] U.S. Cl. ..................................... 242/282; 242/316
[58] Field of Search ............... 242/84.1 R, 84.2 R, 242/84.2 B, 229, 224, 282, 295, 317, 316

[56] References Cited

U.S. PATENT DOCUMENTS

| | | | |
|---|---|---|---|
| 2,580,777 | 1/1952 | Hewlett | 242/84.2 B |
| 2,581,306 | 1/1952 | Slotterback | 242/84.2 B |
| 2,649,257 | 8/1953 | Shelburne | 242/84.2 B |
| 2,746,695 | 5/1956 | Clay | 242/84.2 B |
| 2,925,229 | 2/1960 | Wood | 242/282 |
| 3,498,561 | 3/1970 | Smith | 242/84.1 J |
| 4,332,358 | 6/1982 | Neufeld | 242/84.1 J |
| 4,369,930 | 1/1983 | Noda | 242/84.1 J |

Primary Examiner—Katherine Matecki
Attorney, Agent, or Firm—Bacon & Thomas

[57] ABSTRACT

A fishing line reel operable in both the right-hand and left-hand modes is disclosed. The reel comprises a handle component for connecting the reel to a fishing rod, a housing having a crank and crankshaft to wind fishing line on the reel and anti-reversing lock means to prevent unwinding of the fishing line when actuated. The housing and anti-reversing lock means are rotatable relative to the handle component into two positions approximately 180° apart, corresponding to the right- and left-hand mode positions.

20 Claims, 7 Drawing Sheets

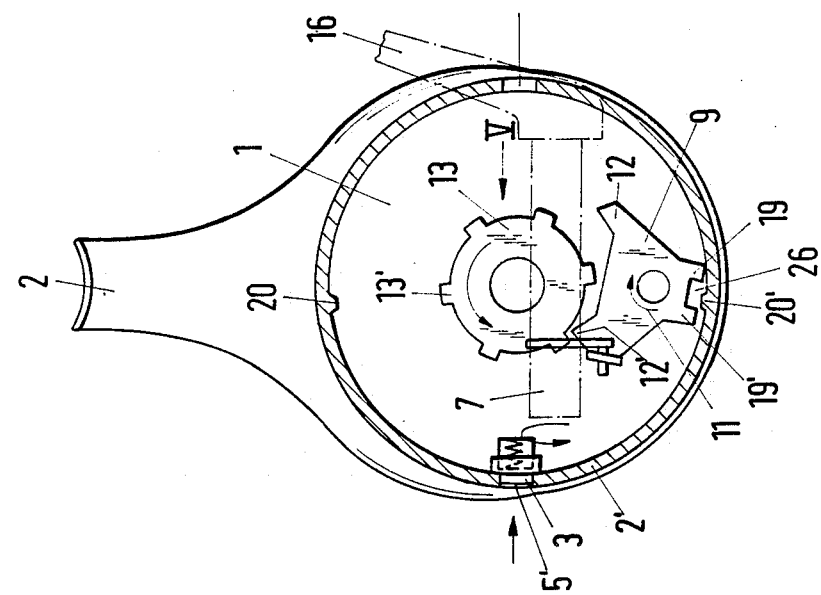
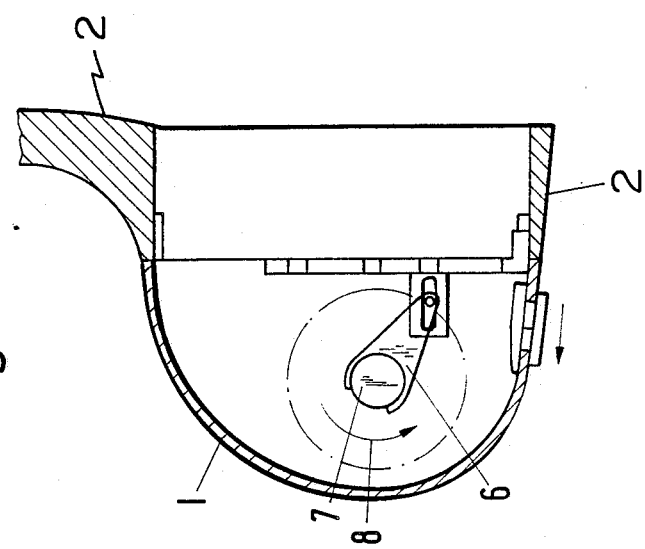

FISHING LINE REEL SELECTIVELY OPERATED IN THE RIGHT-HAND OR LEFT-HAND MODE

BACKGROUND OF THE INVENTION

1. Technical Field of the Invention

The subject invention is directed to a fishing line reel which is selectively operable in the right-hand or left-hand mode.

2. Description of the Prior Art

The expression "right-hand mode" means among anglers that the angler holds the fishing rod with the reel in his right hand while using the left hand to drive the crank winding the line, whereas "left-hand mode" means the rod and reel are held in the left hand and the crank is driven with the right hand.

It is known to provide a crankshaft passing through the reel for the purpose of accommodating the right-hand and left-hand modes of operation; the two crankshaft ends projecting beyond the reel, with the crank being mounted on either end of the crankshaft depending on the desired mode. However, in this known reel when passing from the right-hand to the left-hand mode, the line will be improperly unwound due to the reverse-lock provided and the disposition of the crankshaft and crank. By simply shifting the crank onto the other end of the crankshaft to shift from the right-hand to the left-hand mode, no change in direction of unwinding takes place, so that unwinding of the lines stays in the same direction. For example, when the initial setting of the reel is the conventional setting, i.e., the right-hand mode, the unwinding line rests against the finger tip. This provides for proper control in casting by the angler. However, when the line is operated from the other side, i.e., the left-hand mode, the line comes to rest on the back of the finger or on the nail of the hand holding the rod and not on the finger tip. Accordingly, when passing from the right-hand to the left-hand mode, the angler is no longer able to guide the line by the finger-tip as required for proper control in casting. Rather, the line rests on the back of the finger so that properly controlled casting by the angler is not possible.

SUMMARY OF THE INVENTION

Accordingly, it is an object of the invention to provide a fishing line reel that can pass from either mode into the other with the direction of unwinding of the line from the reel changing to the opposite direction, with provision in both modes being made for problem-free anti-reversing locking. In this manner, proper finger tip control of casting is possible in either mode.

The foregoing object is achieved in accordance with the invention by a fishing-line reel which is selectively adjustable into the right-hand mode and left-hand mode of operation comprising a handle component for connecting the reel to a fishing rod, a housing having a crank and crankshaft to wind fishing line on the reel and anti-reversing lock means to prevent unwinding of fishing line when activated. The crank is disposed at one end of the crankshaft and is accessable from only one side of the housing. The housing is circumferentially rotatable relative to the handle component into two positions offset by approximately 180° corresponding to the right- and left-hand mode positions. The anti-reverse locking means is also movable into two positions which provide anti-reverse locking in opposite directions, depending upon whether the housing is in the right- or left-hand mode.

The fishing line reel of the invention provides numerous advantages over existing reels. In particular, the rotatable housing allows transition from one mode to the other in a simple manner without requiring the angler to dismantle the crank from one end of its shaft and mount it on the other end. The rotation of the housing and crank in the reel of the invention assures that the direction of rotation of the crankshaft is reversed. This, in turn, assures that the unwinding direction of the line will also reverse so that finger tip control of the line is maintained in either operating mode. The movable anti-reverse locking means assures that this means can be disposed in the proper position depending upon the operating mode. In principle, changing the direction of the anti-reverse locking means can be performed manually. However, as such an operation may be overlooked while fishing, it is preferable to carry out the positioning of the anti-reverse locking means automatically by having it be movable in conjunction with the rotation of the housing of the reel.

In operating the fishing line reel of the invention, the fisherman must decide when winding the line on the spool of the reel, whether the direction of winding shall be the right-hand or the left-hand mode. Then, when the line is cast, it will rest against his finger tip. If the operating mode is changed, then the winding direction of the line also must be changed inside the reel by rotation of the housing.

Further advantages and features of the invention are discussed in the description below and shown in the attached drawings of the embodiments of the invention.

BRIEF DESCRIPTION OF THE FIGURES OF DRAWING

FIG. 4 shows the crank, crankshaft, ratchet-wheel, and pawl in the left-hand mode position in a fishing line designed in accordance with the present invention;

FIG. 5 is a partial section or elevation along the arrow V of FIG. 4;

DETAILED DESCRIPTION OF THE PREFERRED EMBODIMENTS

Figure 1:
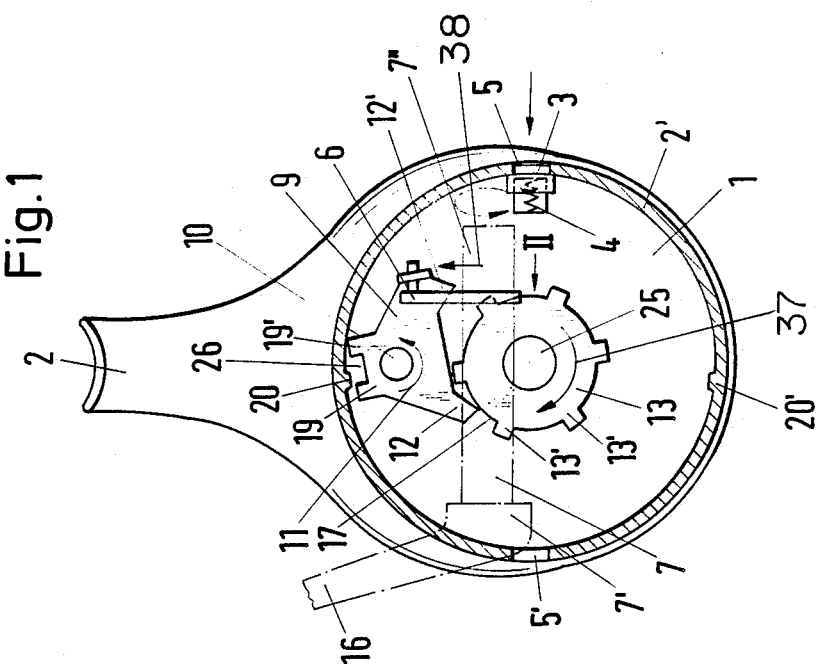
FIG. 1 is an elevation of a crank, crankshaft, ratchet-wheel, and pawl, when the parts are in the right-hand mode position in a fishing line reel designed in accordance with the present invention.

Referring to FIG. 1, the housing 1 of the fishing line reel is enclosed by a ring 2' merging into a handle component 2 bearing a handle. A spring 4 with a small bolt 3 pressed by this spring 4 into a hole 5 in the ring 2' is provided in the housing 1. This snap-in means serves as a stop member to define the position of the housing 1 relative to the handle component 2 in the "right-hand mode". For the "left-hand mode", a corresponding hole 5' offset by 180° is provided in the ring 2'. The pivoting position of the housing 1 relative to the position constant handle component 2 keeps the position of the crank 16 and that of the crankshaft 7 which drives relative to the housing 1 the same. The crankshaft 7 projects only at one end 7' from the housing 1, not by its other end 7".

Figure 2:
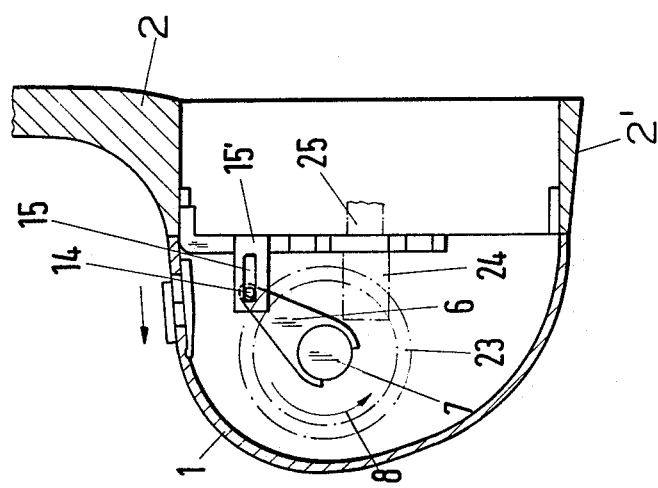
FIG. 2 is a partial section and also elevation along the arrow II of FIG. 1.

The ratchet wheel and its operation, initially for the right-hand mode, will be explained in relation to FIGS. 1 and 2. The fishing line is wound by a winding cap having line catching pins (not shown) which is engaged by drive shaft 25. Drive shaft 25 engages ratchet wheel 13 within housing 1. At the so-called first "go" by the angler or when a fish pulls on the line, the drive shaft 25 and ratchet wheel 13 are rotated in the direction of arrow 37. A crown gear 23 is joined to crankshaft 7 and engages a drive pinion 24 joined to drive shaft 25. As a consequence, the rotation of drive shaft 25 causes a corresponding rotation of crankshaft 7 in the direction of arrow 8. To simplify the drawings, the above cited drive components are only partially shown in the other figures.

A frictional drag component 6 is mounted on the crankshaft 7 and engages by a pin 14 into a slot 15 of a bracket 15' of pawl 9. Upon rotation of crankshaft 7 in the direction of arrow 8, drag component 6 is moved in the direction of arrow 38, thereby pivoting pawl 9 about its hinge 10 in housing 1 in the direction of arrow 11. Pawl 9 comprises two arms, that is, it has two locking arms 12 and 12', and in this right-hand mode of operation, upon rotation of pawl 9 in the direction of arrow 11, the locking arm 12 enters space 17 between two of the locking beaks 13' of ratchet wheel 13. The moment the locking arm 12 comes to rest against the next locking beak 13' (shown to the left of it in FIG. 1), the anti-reversing lock is operative and shafts 7 and 25 and the parts connected with them are no longer able to rotate.

The directions of arrows 8, 11, and 37, therefore, indicate the directions of rotation of the components when a fish is pulling on the line. When the fishing line is pulled in, the crankshaft 7 is rotated by the crank 16 opposite the direction of the arrow 8, the pivoting member 6 will then rotate correspondingly and turn the pawl 9 about its hinge 10 opposite to the direction of arrow 11, whereby the locking arm 12 moves out of the rest zone of the locking beaks 13', and the drive shaft 25 is then released and the fishing line may be rewound onto the reel.

Two cams 20 and 20' mutually offset by about 180° are mounted on the inside of ring 2' and act as the switching and locking components when the operational direction of the anti-reversing lock is inverted. These cams 20 and 20' assure that for the particular pivot position of the ring 2' with handle component 2 relative to the housing 1, the anti-reversing lock is operative only in the desired direction by the cam 20 being in a space 26 between two projections 19, 19' of the pawl. As regards the right-hand mode of FIGS. 1 and 2, the projection 19 comes to rest against the inside end surface of the cam 20 when the pawl pivots opposite the direction of arrow 11, i.e., when the fishing line is pulled in, whereby further rotation of the pawl is prevented and the second locking arm 12' cannot arrive in the rest zone of the locking beaks 13' of the ratchet 13.

Figure 3:
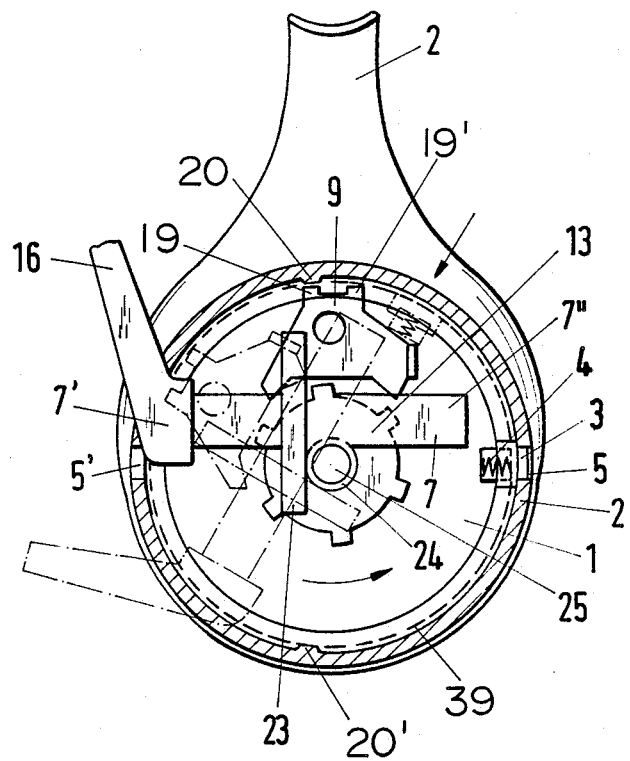
FIG. 3 shows the drive in an elevation similar to FIG. 1, with the pivoting motion of the housing shown by dash-dot lines.

FIG. 3 shows pawl 9 in a position where no locking takes place. The inwardly directed surfaces of cams 20, 20' extend along the dashed circle 39 upon the pivoting motion of ring 2' and handle component 2 and are directly opposite the outside surface of pawl projection 19. This allows the housing 1 to be rotated by 180° relative to handle component 2.

In dot-dashed lines, FIG. 3 shows an intermediate position of crank 16 and crankshaft 7 when in transit from the right-hand mode to the left-hand mode (or vice-versa).

FIGS. 4 and 5 show the positions and operations of the components in the left-hand mode. The bolt 3 is in the hole 5'. The drag component 6 operates and drives the pawl 9 essentially similarly as in relation to FIGS. 1 and 2, except that in the event of a pull by the angler or one by the fish on the line, it is not the locking arm 12, but instead the second locking arm 12' which moves into the locking space of the locking beaks 13' of the ratchet 13. In order to prevent pivoting of the pawl 9 opposite the direction of the arrow 11 shown herein and thereby rotation of the first locking arm 12 into the locking zone of the locking beaks 13' when pulling in, provision is made for the cam 20' which in this event comes to rest with its inner front surface in space 26 between the projections 19' and 19 and thereby prevents further rotation of the pawl 9 opposite the direction of the arrow 11.

The cam 20, 20' cooperating with the projections 19, 19' are provided in the above design to achieve the two discussed locking positions, but in such a way that the cams 20, 20' are not precisely mutually opposite by 180°. Instead, in the view of FIGS. 1, 3, 4, and 6, the cam 20' is somewhat offset in the clockwise sense from the 180° diametrical position relative to the cam 20. In this respect, the spacing between the projections 19 and 19' must be taken into account to achieve the two stop positions 20 at 19 and 20' at 19'.

Figure 6:
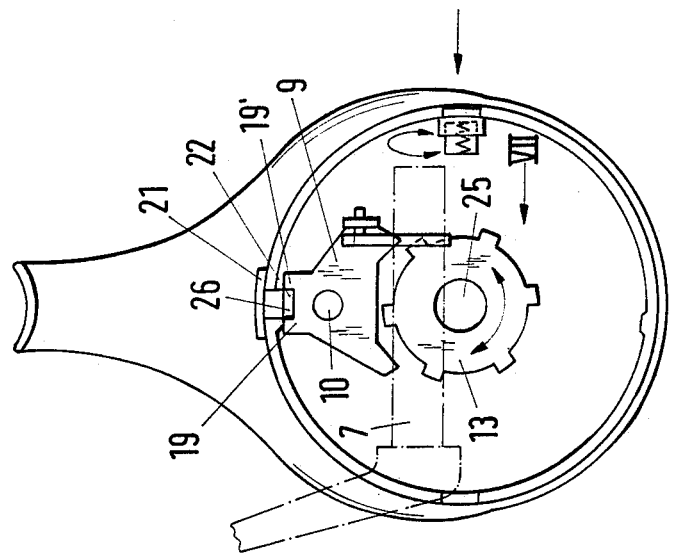
FIG. 6 is a view similar to FIGS. 1 and 4, however with the ratchet-wheel being locked in neutral.
Figure 7:
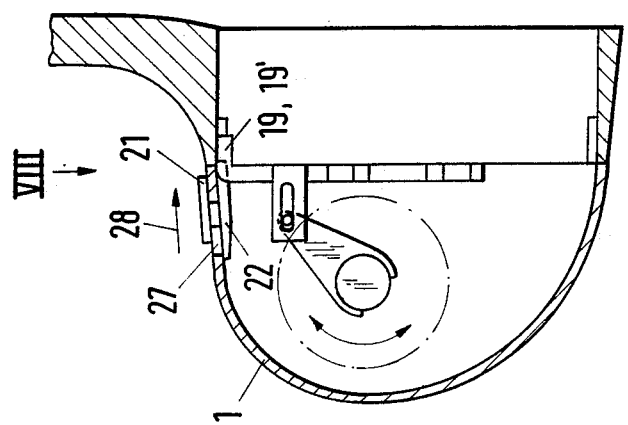
FIG. 7 is a partial section and view along arrow VII of FIG. 6.
Figure 8:
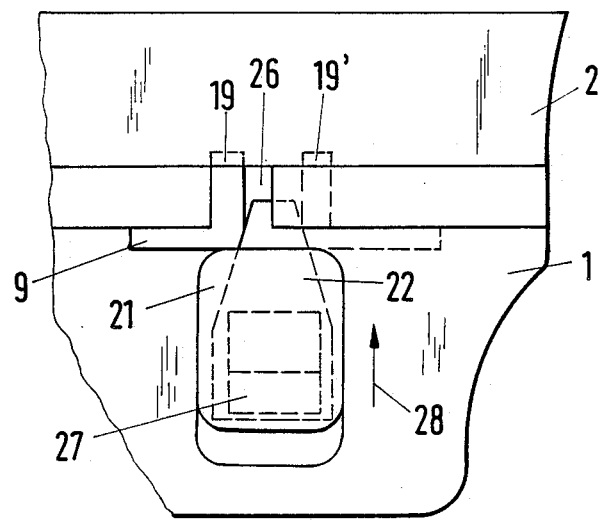
FIG. 8 is an enlarged view along the arrow VIII of FIG. 7.

FIGS. 6 through 8 show the feasibility of blocking or stopping the pivoting motion of the pawl 9 on its hinge 10 with a stop means 22 having a handle 21. Stop means 22 is displaceable within a slot 27 of the housing 1. If the stop 22 is moved in the direction of the arrow 28 it will arrive in space 26 between the projections 19, 19' and the pawl 9 will be locked in neutral (FIG. 6). In this case, the anti-reversing lock is disengaged whether in the right-hand or in the left-hand mode. FIG. 8 shows the relevant view along the arrow VIII in FIG. 7.

Figure 9:
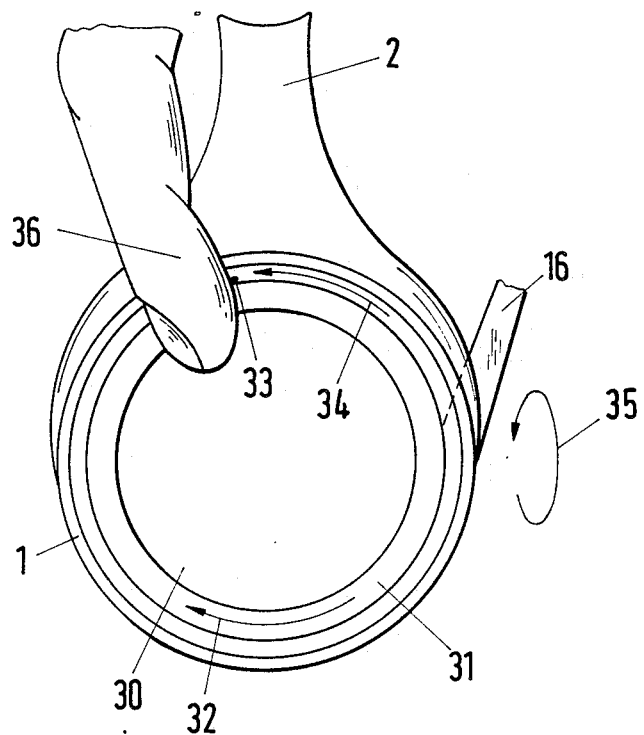
FIG. 9 is a front view of the fishing reel for right-hand mode, also showing the winding and unwinding direction.
Figure 10:
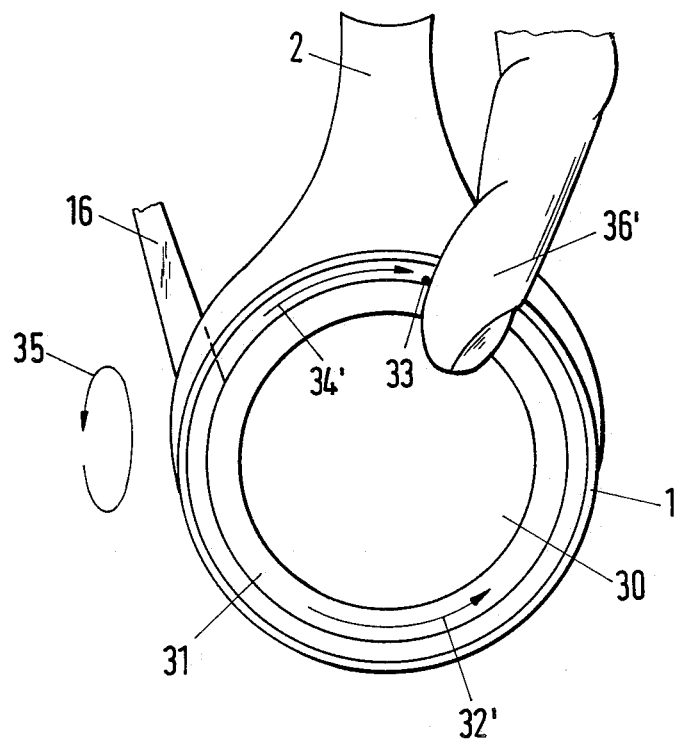
FIG. 10 is a front view according to FIG. 9, however for left-hand mode and showing the winding and unwinding directions.

FIGS. 9 and 10 show the principle of handling and operating the fishing line reel for the right-hand and the left-hand modes. A fishing reel is assumed, which initially is set for the (normal) right-hand mode, that is, having had its fishing line correspondingly wound on the spool of the reel. The angler holds the rod with the right hand. His right index finger is shown in the drawing, the finger tip being denoted by 36. If now the crank 16 is rotated using the left hand in the direction 35, that is from "bottom" to "rear" and from there to "top" and then to "front", etc., then the winding direction 32 is achieved. The fishing line 33 is released for casting by depressing a pushbutton 30. It always runs in the direction opposite to winding, that is, in the direction herein denoted by 34, with the angler being free to put his finger tip 36 located on the inside against the line 33 as needed or desired. Reference numeral 31 denotes a reel cap as is well known in the art.

When passing from the right-hand mode shown in FIG. 9 to the left-hand mode shown in FIG. 10, the rod with the handle component and ring 2 and 2', respectively, remains in the position of FIG. 9, however the rod and reel will be held in the left hand of the angler, that is, reference numeral 36' denotes the top of the left index finger of the angler. Further, the housing 1 is pivoted by 180° relative to the handle component and snapped into position in the new pivoting location as previously described. The crank 16 is located on the other side of the reel and is rotated in the direction 35 by the right hand, where the direction of rotation 35 is identical with the direction 35 of the right-hand mode of FIG. 9. Consequently, the winding direction is reversed as shown at 32'.

Because in such fishing line reels the unwinding direction is always opposite the winding direction, it follows that the unwinding direction 34' also is opposite the right-hand mode of FIG. 9. Accordingly, the angler also can hold the fishing line 33 with the inside finger tip 36', i.e. he can make the finger tip rest against this line when in the left-hand mode.

Finally, it should be noted that the view of FIGS. 9 and 10 are front views whereas the view in FIGS. 1, 3, 4, and 6 are rear views of the fishing line reel. As a result, the crank 16 will be on the right in the right-hand mode shown in FIG. 9, whereas it will be on the left in the representation fo FIG. 1 and in the left-hand mode shown in FIG. 10, the crank 16 is on the left, whereas in FIG. 4 it is on the right.

While the invention has been described in terms of certain preferred embodiments, one skilled in the art will readily appreciate that various modifications, changes, omissions and substitutions may be made without departing from the spirit thereof. It is intended, therefore, that the present invention be limited solely by the scope of the following claims.

I claim:

1. In a fishing line reel which is selectively adjustable into a right-hand mode and a left-hand mode of operation comprising a handle component for connecting said reel to a fishing rod, a housing which rotatably supports a crank and a crankshaft, a winding cap arranged to rotate with said crankshaft and an anti-reversing locking means arranged to prevent rotation of said crankshaft in a predetermined direction which depends on the mode of operation, the improvement comprising:
   said crank is mounted in a bore located on one side of said housing;
   said housing is rotatably mounted to said handle component between predetermined stop positions to establish said right-hand and left-hand modes of operation and said anti-reversing locking means is rotatable with said housing; and
   said handle component includes means arranged to activate said anti-reversing locking means when said housing is rotated such that the direction of rotation of said crank shaft permitted by said anti-reversing locking means is automatically reversed during rotation of said housing between the stop positions.

2. The improvement in a fishing line reel as claimed in claim 1, said housing including a spring activated stop member and said handle component including a ring surrounding said housing and wherein said ring contains two apertures spaced approximately 180° apart for receiving the spring activated stop member of said housing, said stop member arranged to cooperate with said apertures to fix said housing in position for right-hand mode or left-hand mode operation.

3. The improvement in a fishing line reel as claimed in claim 2, wherein said means arranged to activate said anti-reversing locking means includes two locking members mutually offset by approximately 180° which maintain the anti-reversing locking means in the right-hand or left-hand mode positions.

4. The improvement in a fishing line reel as claimed in claim 3, wherein the anti-reversing locking means comprises a double arm pawl pivotably supported in the housing and wherein the housing further contains a ratchet wheel mounted on a drive shaft of the reel and provided on its periphery with mutually spaced locking beaks abutting and retaining one of the arms of said double arm pawl corresponding to the particular locking position.

5. The improvement in a fishing line reel as claimed in claim 4, further comprising a frictionally driven drag member mounted on the crankshaft of the reel such that when the crankshaft is rotated in one direction, the pawl pivots together with one of its locking arms into the zone between the locking beaks of the ratchet and when the crankshaft is rotated in the opposite direction said locking arm is pivoted out of the zone between the locking beaks of the ratchet.

6. The improvement in a fishing line reel as claimed in claim 5, wherein said locking arm is prevented from pivoting into the zone between the locking beak of the ratchet when the crankshaft is rotated in said opposite direction by one of said two locking members of said handle component.

7. The improvement in a fishing line reel as claimed in claim 6, wherein said pawl includes two radially outwardly extending projections and said locking member of said housing comprises two cams positioned such that, in the right-hand and the left-hand modes of operation, a respective one of the cams is located between the projections of said pawl, thereby rendering the anti-reversing locking means operative in only one direction.

8. The improvement in a fishing line reel as claimed in claim 7, wherein said cams are disposed less than 180° apart on the handle component in one direction.

9. The improvement in a fishing line reel as claimed in claim 7, further comprising a stop to fix said pawl in a neutral pivoting position in which neither locking arm is located in the zone between two locking beaks of the ratchet wheel.

10. The improvement in a fishing line reel as claimed in claim 9, wherein said stop is a slide member which is positioned between the projections of the pawl.

11. A fishing reel which is selectively adjustable between a right-hand mode and a left-hand mode of operation comprising:
   a housing which rotatably supports a crank and a crankshaft, said crank being mounted in a bore which is open on only one side of said housing;
   a handle component for connecting the reel to a fishing rod, said handle component including means for rotatably supporting said housing, said housing being selectively rotatable, relative to said handle component, between two predetermined stop positions, offset by 180°, to establish said right-hand and left-hand modes of operation respectively;
   anti-reversing lock means rotatable with said housing and arranged to prevent rotation of said crankshaft in a predetermined direction which depends on the mode of operation; and means, carried by said handle component, arranged to activate said anti-reversing lock means when said housing is rotated such that the direction of rotation of said crank shaft permitted by said anti-reversing lock means is automatically reversed during rotation of said housing between the stop positions.

12. A fishing reel as claimed in claim 11, said housing including a spring activated stop member and said handle component including a ring surrounding said housing and wherein said ring contains two apertures spaced approximately 180° apart for receiving the spring activated stop member of said housing, said stop member arranged to cooperate with said apertures to fix said housing in position for right-hand mode or left-hand mode operation.

13. A fishing reel as claimed in claim 12, wherein said means carried by said handle component and arranged to activate said anti-reversing lock means includes two locking cam members mutually offset by approximately 180° arranged to maintain the anti-reversing lock means in the right-hand or left-hand mode positions.

14. A fishing reel as claimed in claim 13, wherein the anti-reversing lock means comprises a double arm pawl pivotably supported in the housing and wherein the housing further contains a ratchet wheel mounted on a drive shaft of the reel and provided on its periphery with mutually spaced locking beaks abutting and retaining one of the arms of said double arm pawl corresponding to the particular locking position.

15. A fishing reel as claimed in claim 14, further comprising a frictionally driven drag member mounted on the crankshaft of the reel such that when the crankshaft is rotated in one direction, the pawl pivots together with one of its locking arms into the zone between the locking beaks of the ratchet and when the crankshaft is rotated in the opposite direction said locking arm is pivoted out of the zone between the locking beaks of the ratchet.

16. A fishing reel as claimed in claim 15, including means for preventing said locking arm from pivoting into the zone between the locking beak of the ratchet when the crankshaft is rotated in said opposite direction by one of said two locking members of said handle component.

17. A fishing reel as claimed in claim 16, wherein said pawl includes two radially outwardly extending projections and said two locking cam members are positioned such that, in the right-hand and the left-hand modes of operation, a respective one of the cams is located between the projections of said pawl, thereby rendering the anti-reversing locking means operative in only one direction.

18. A fishing reel as claimed in claim 17, wherein said cam members are disposed less than 180° apart on the handle component in one direction.

19. A fishing reel as claimed in claim 18, further comprising a pawl stop to fix said pawl in a neutral pivoting position in which neither locking arm is located in the zone between two locking beaks of the ratchet wheel.

20. A fishing reel as claimed in claim 19, wherein said pawl stop is a slide member which is positioned between the projections of the pawl.

* * * * *